F. P. BOLAND.
PROCESS AND MEANS FOR FILTERING WATER.
APPLICATION FILED NOV. 23, 1915.
1,217,397.
Patented Feb. 27, 1917.
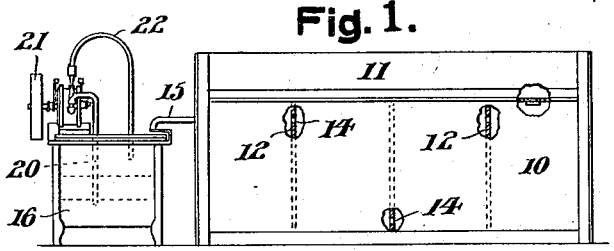
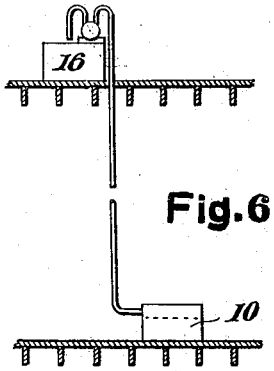
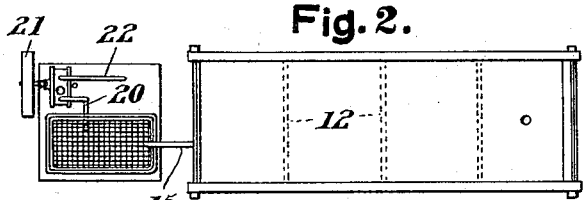
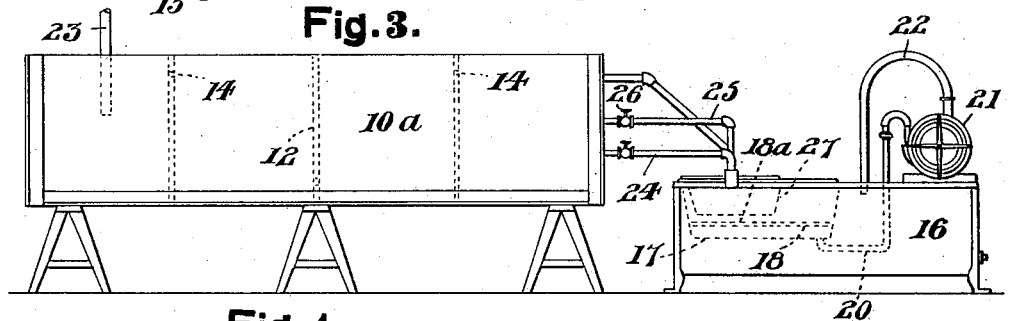
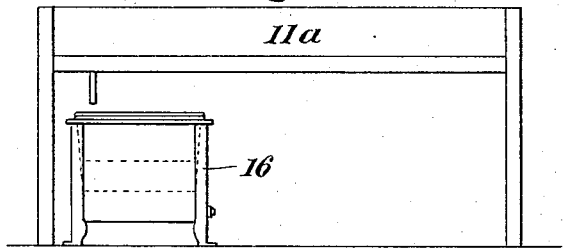
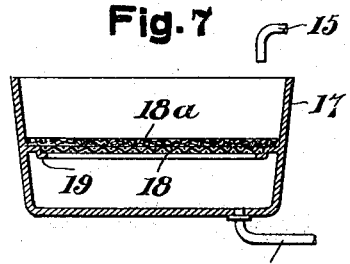
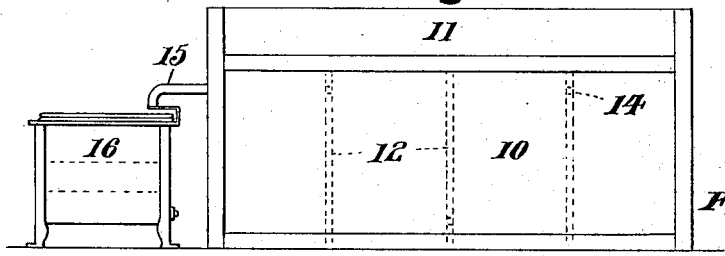
Inventor
Franis P. Boland
By A. M. Wilson
Attorney

UNITED STATES PATENT OFFICE.

FRANCIS P. BOLAND, OF PROVIDENCE, RHODE ISLAND.

PROCESS AND MEANS FOR FILTERING WATER.

1,217,397.            Specification of Letters Patent.     Patented Feb. 27, 1917.

Application filed November 23, 1915. Serial No. 63,032.

*To all whom it may concern:*

Be it known that I, FRANCIS P. BOLAND, a citizen of the United States, residing at Providence, in the county of Providence, and State of Rhode Island, have invented certain new and useful Improvements in Improved Processes and Means for Filtering Water, of which the following is a specification.

My invention relates to improved processes and means for filtering water containing precious metals in a manner as hereinafter fully set forth and claimed.

In carrying out my present invention I employ in connection with a water receptacle, such as a wash sink, a receiving tank associated with the sink or so placed with respect thereto as to receive the water discharged from the sink. Associated with the wash sink and receiving tank is a filtering-tank that receives the water from the receiving-tank and has arranged therein a filtering basin. The filtering basin in which the water from the receiving-tank is received has an imperforate bottom with which the intake of a pump is connected for drawing the water by suction from the filtering tank, the discharge of the pump being into the filtering tank outside of the filtering basin, and the filtered water being discharged from the filtering tank to the sewer or other waste outlet.

In the accompanying drawings is represented, somewhat diagrammatically, different forms of devices for carrying out the process according to the conditions which may exist in the factory, shop or the like where the system may be installed.

In these drawings:

Figure 1 is a view in side elevation of a preferred form of apparatus, partly broken away and in section, in accordance with my invention.

Fig. 2 is a top plan view of the same.

Fig. 3 is a view in side elevation of a modified form of apparatus embodying the same principle of operation as the apparatus shown in Figs. 1 and 2, but arranged to meet certain specific conditions.

Fig. 4 is a view in side elevation of a further modified form of apparatus.

Fig. 5 is a view in side elevation of another form of apparatus.

Fig. 6 is a diagrammatic view showing the system arranged to meet conditions where the water to be filtered is pumped or otherwise forced into the filtering tank, and, Fig. 7 is an enlarged vertical sectional view of the filtering basin, removed from the filter tank.

The system is particularly adapted for use in jewelry factories, shops and the like where a large quantity of fine particles of precious metal adheres to the hands of the workman, to his overalls, apron, or towel, and which, unless recovered by the filtering of the wash water in which the hands of the workman's apparel is washed, passes into the waste and results in a considerable annual loss.

It is the common practice also in factories of this character to pickle the material and wash it out at the sink, to wash out polishing tanks, or sink tanks, etc., the sediment in which always contains more or less valuable metals that owing to their nature or form may be saved by my process of filtering the water as hereinafter more fully described.

Referring to the drawings in detail, the embodiment of the invention shown in Figs. 1 and 2 comprises a collecting tank 10 which in this construction is combined with a wash sink 11. The tank 10 is provided with a plurality of partitions 12, three being shown, thus dividing the tank into four compartments. The number of these compartments will be varied by the increasing or decreasing of the number of partitions. The water from the wash sink is discharged into the compartment at one end of the tank and rises in this compartment until it reaches apertures 14 in the first partition near the top thereof, and overflows into the next compartment, escaping into the succeeding compartment through apertures 14 near the bottom of the second partition, rising in the third compartment until it overflows through apertures 14 in the third partition, near the top thereof, into the fourth, or last compartment from which it escapes through the outlet pipe 15 that is placed substantially in line with the openings in the end partitions. This arrangement provides for a circulation of the water in its passage through the tank, carrying therewith the fine particles of precious metals it is desired to recover in the filtering tank.

The outlet pipe 15 discharges into a filter-tank 16 disposed at the end of the tank 10. This filter tank is open at the top and has mounted therein toward one side or end thereof in any suitable manner, a filter-basin 17 into which the water from pipe 15 is discharged. In this filter-basin there is a false bottom usually formed of a screen mesh 18 that is suitably supported as by a plurality of brackets 19, and on top of the mesh is a layer of felt, cotton batting, or equivalent filtering material 18ª, the layer and screen being readily removable from the top of the basin.

The water that is discharged into the filter-basin is drawn through the filtering material by suction, the filtering material retaining the fine particles of precious metal that the water contained when it was received in the filter-basin. This suction, I have in practice, advantageously accomplished by connecting one end of a pipe 20 with the space between the filter basin bottom and the filtering material and connecting the other end of this pipe with a pump 21 which is usually mounted for convenience upon the tank 16, the discharge 22 of this pump being into the main tank 16 outside the filter-basin from whence the filtered water is conducted off to a sewer or other waste outlet. The driving power for the pump may be from any suitable source.

The same system is involved in the construction shown in Fig. 3, this arrangement showing the receiving-tank and filter located at a point remote from the wash sink, and means being provided to care for the filtering when the power plant of the factory, shop or the like is shut down. In this construction the receiving-tank 10ª is of a form as described for Figs. 1 and 2. It may be located for instance, on one floor of the shop or factory and the water led thereto through a pipe 23 from a floor or floors above. The filter tank, filter-basin and pump arrangement is identical with that above described, and the same reference characters therefore apply thereto. The outlet pipe 15 from tank 10ª discharges into the filter-basin, and I provide here two additional pipes 24, 25, each provided with a valve 26. In operation during the day, when power is had for operating the pump, the valve 26 in pipe 24 or 25 may be opened, keeping the tank 10ª somewhat drained. Then when the power is shut off, such workmen as afterward wash their hands in the sink will not use more water for this purpose than will fill up the tank 10ª. I may or may not use in either of these constructions, in connection with the filter-basin, a small catch basin 27 of mesh arranged to receive the discharge of water from pipe 15 so as to catch lumps of soap and similar relatively large particles of foreign substance and prevent them falling into the filter-basin.

It is to be noted that the collecting tank 10 or 10ª provides for a rise and fall flow of the water during its passage through the tank due to the arrangement of the apertures 14, these apertures, as stated, being placed near the top and bottom respectively of alternate partitions. The lower apertures being placed some little distance above the bottom of the tank, there is thus provided a settling zone in the bottom of the tank for dirt and other heavy foreign substance, while the lighter non-liquid particles of precious metal due to their flaky nature, are kept in suspension by the circulating of the wash water, the flow of the water to the outlet being retarded due to the provision in the tank of the baffling partitions 12, and the disposition of the apertures 14 in said partitions, but being kept in circulation during its passage through the tank.

In Fig. 4 apparatus is shown for carrying out the process without the aid of the receiving tank under the sink. In this construction, I permit the wash water from the sink 11ª to drain direct into the filter tank 16, the latter being the same as heretofore described, having the filter-basin, etc., no suction however being provided as in the former constructions, the water being permitted to gradually drain through the filtering material.

In the construction shown in Fig 5, the same form of sink 11 and tank 10 as in Figs. 1 and 2 is employed, the suction feature however, being dispensed with in this construction as in Fig. 4.

In some installations however, it may be necessary to pump the water from the tank 10 to the filter-tank 16. This I accomplish as illustrated in Fig. 6. I therefore do not wish to limit myself to a construction in which the water from the receiving tank flows by gravity into the filter-tank, as the same principle of filtration is employed where the water is pumped or otherwise conducted to the filter tank.

The method herein described in detail is to be distinguished from the filtering of liquids to separate the different liquids one from the other, since the separation here effected is of non-liquid particles. In the method as described it is to be observed that I provide for a tortuous flow of the wash water containing the non-liquid particles, at a flow rate insufficient to carry the sediment in the water therewith, allowing such sediment, which is usually very fine in nature, to settle to the bottom of the tank. The particles of precious metal however, are of a flaky nature and are therefore held in suspension by the agitation of the water, and are carried along in the slow forming stream to the filter where they are collected and retained as the water which has been freed from the sediment and the particles of precious metal as well, is drawn off and discharged.

Where the particles of precious metal are of a lumpy nature, they will settle with the sediment in the tank and be recovered when the tank is cleaned out. But in this particular work, practically all the particles to be recovered are of a filmy, flaky or flat form or in the form of small shavings, which owing to this form are kept suspended in the moving water and are carried along therewith to the point of discharge, and which for the most part may be burned out from the fine particles of the precious metals.

As frequently as may be necessary, the filtering media 18ª is renewed, the removed ones being burned or otherwise treated to recover the precious metal therefrom.

What I claim as new is:—

The method of collecting non-liquid particles of precious metals from waste wash water from jewelers' manufacturing establishments, which consists in producing a slow overflow of a body of the wash water through a restricted passage into the top of a second body of said waste wash water to collect sediment not readily burned in the bottom of the first body of said water and permit the carrying off of the suspended non-liquid particles of precious metals through the restricted passage into the second body of water, then slowly discharging the second body of waste wash water through a second restricted passage above the bottom and considerably below the surface level of the second body of said water to collect additional sediment not easily burned in the bottom thereof and insure the carrying off of the suspended non-liquid particles of precious metals, filtering the discharged non-sediment carrying waste wash water from the said second body through a combustible filtering material to collect therefrom the suspended non-liquid particles of precious metals, and finally burning the filtering material to recover the particles of precious metals.

In testimony whereof I affix my signature.

FRANCIS P. BOLAND.

Witness:
CALVIN H. BROWN.

Copies of this patent may be obtained for five cents each, by addressing the "Commissioner of Patents, Washington, D. C."